(12) United States Patent
Vance et al.

(10) Patent No.: US 8,294,073 B1
(45) Date of Patent: Oct. 23, 2012

(54) HIGH ANGULAR RATE IMAGING SYSTEM AND RELATED TECHNIQUES

(75) Inventors: Leonard Dean Vance, Tucson, AZ (US); Kent P. Pflibsen, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 749 days.

(21) Appl. No.: 12/571,941

(22) Filed: Oct. 1, 2009

(51) Int. Cl.
*G01C 21/02* (2006.01)
*G01C 21/24* (2006.01)
*G01J 1/20* (2006.01)

(52) U.S. Cl. ............... 250/203.1; 250/206.1; 250/208.1; 356/139.01; 356/139.04; 359/399

(58) Field of Classification Search .... 250/203.1–203.4, 250/208.2, 206.1, 206.2, 203.6, 208.1; 356/139.01, 356/139.04, 29; 359/399; 340/540, 541, 340/555–557
See application file for complete search history.

(56) References Cited

U.S. PATENT DOCUMENTS

| | | | | |
|---|---|---|---|---|
| 7,151,245 | B2 * | 12/2006 | Atmur | 250/203.1 |
| 7,612,317 | B2 * | 11/2009 | Chalfant et al. | 250/203.1 |
| 7,920,324 | B2 * | 4/2011 | Holmes | 359/429 |
| 7,961,301 | B2 * | 6/2011 | Earhart et al. | 356/4.01 |

* cited by examiner

*Primary Examiner* — Francis M Legasse, Jr.
(74) *Attorney, Agent, or Firm* — Daly, Crowley, Mofford & Durkee, LLP

(57) ABSTRACT

An imaging device includes a sensor to locate and track an object of interest; an imaging camera having a plurality of detectors juxtapositionally aligned to increase the field of regard of an image of interest and a plurality of corresponding illuminators, each illuminator co-aligned with the field of view of a corresponding detector; and a digital processor connected to the sensor to receive tracking signals indicative of the track of the object of interest and connected to the imaging camera to provide a control signal to the imaging camera to activate each one of the detectors when the object of interest is within the field of view of a detector.

18 Claims, 15 Drawing Sheets

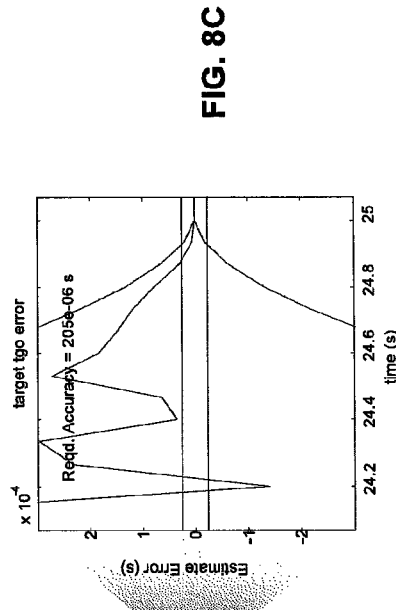
FIG. 8A
FIG. 8C
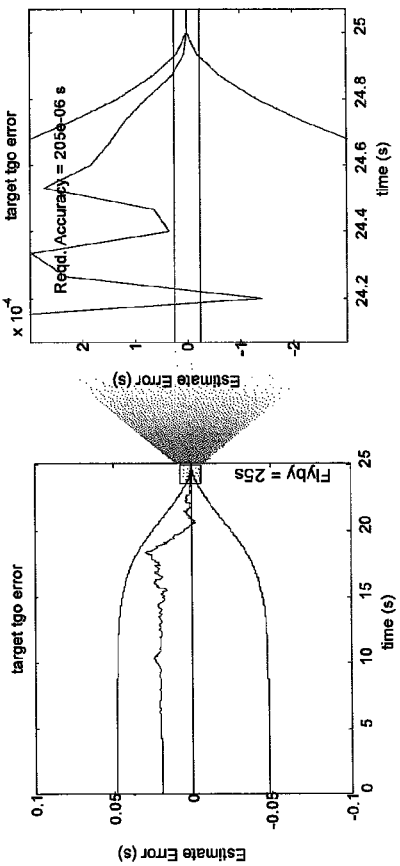
FIG. 8B
FIG. 8D

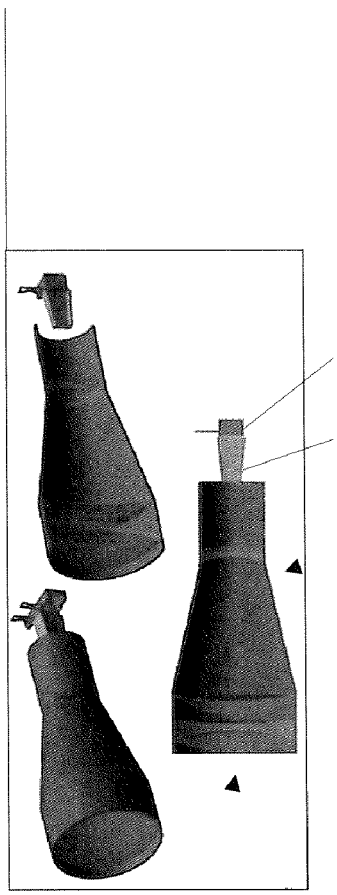
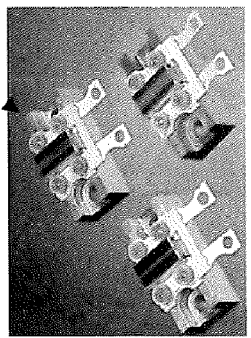
FIG. 11
FIG. 11A

HIGH ANGULAR RATE IMAGING SYSTEM AND RELATED TECHNIQUES

FIELD OF THE INVENTION

This invention relates generally to imaging systems and more particularly to systems and techniques to capture images of objects passing by at orbital velocities.

BACKGROUND OF THE INVENTION

In air and space applications, it is often desirable using optical sensors to take pictures of objects passing by at orbital velocities. It is often difficult to capture a desired image under such conditions, where a precise understanding of flyby timing is required and processing such images require short integration times. With desired high resolution imagery for objects with line of sight rates greater than 2000 degrees per second, capturing and processing such images require an improved solution.

It would, therefore, be desirable to provide an imaging system capable of capturing mages of objects of interest passing by at orbital velocities.

SUMMARY OF THE INVENTION

In accordance with the present invention, an imaging device includes a cueing sensor to locate and track an object of interest and imaging cameras, each camera having a plurality of detectors juxtapositionally aligned to photograph an object from multiple angles, optional co-aligned illuminators, and a digital processor connected to the cueing sensor to receive tracking signals indicative of the track of the object of interest and connected to the imaging camera to provide a control signal to the imaging camera to activate each one of the detectors when the object of interest is within the field of view of the detectors. With such an arrangement, high resolution pictures can be taken of orbital objects from platforms not in the same orbit as the object of interest.

In accordance with a further aspect of the present invention, the digital signal processor provides a control signal in response to the tracking signal from the cueing sensor to shift the field of view of the plurality of detectors to repeatedly capture digital images of the object of interest with the plurality of detectors. With such an arrangement, using digital processing techniques, the repeatedly captured digital images can be combined to provide an enhanced three dimensional quality image of the object of interest.

It should be appreciated that the present invention approaches a photographic subject on a close approach trajectory (i.e. within hundreds of meters) where a small cueing sensor tracks the subject in the last few seconds before closest approach. Estimation theory filtering generates knowledge about the timing of the orbital encounter which is used to activate (fire) illumination strobes at the precise moments the subject passes closest approach. Linear charge transfer on the camera focal plane is used to produce adequate signal to noise ration as the subject moves very quickly through the field of view. Using estimation theory with the cueing sensor combined with the linear charge transfer within a camera provides the high resolution images of objects encountered at extremely high line of sight rates (in excess of 2000 degrees/second). The latter allows high resolution pictures to be taken of orbital objects from platforms not in the same orbit.

BRIEF DESCRIPTION OF THE DRAWINGS

The foregoing features of this invention, as well as the invention itself, may be more fully understood from the following description of the drawings in which:

FIGS. 8A and 8C include graphs showing various error statistics of a camera vehicle;

FIGS. 8B and 8D show an example of the respective corresponding software code to implement the timing requirements;

FIG. 11 is a sketch of an embodiment of an illuminator assembly for an imaging system according to the invention;

FIG. 11A is a view of laser diodes used in the illuminator assembly;

DETAILED DESCRIPTION OF THE INVENTION

Before providing a detailed description of the invention, it may be helpful to review the state of the art of imaging systems used for space object surveillance. It should be appreciated that an innovative technique is required for optical sensors which record high-resolution imagery of objects having extremely high line of sight rates (200 to 3000 deg/s). This invention provides a unique solution to space object surveillance in that it approaches the problem with a small, light weight vehicle and camera embodiment. By employing a cueing sensor to locate and maneuver to an object of interest and then using an innovative, body fixed imaging camera to capture images of the object, a technique is provided that greatly reduces the cost of more traditional space surveillance solutions. Traditional approaches require the use of gimbaled or large diameter telescopes that are difficult to design, expensive to produce and very heavy to launch. The innovative imaging camera of the present invention with precise timing allows the use of relatively small power lasers or at times solar illumination small, lightweight sensors without moving parts. Taking pictures of objects passing by at orbital velocities requires extremely short integration times and a precise understanding of flyby timing. The present invention employs a forward looking sensor for optimal estimation of target states using an Extended Kalman Filter (EKF). This establishes the precise timing necessary to capture the target at flyby. The use of Kalman filter track prediction algorithms allows the precise knowledge necessary to image objects as they pass by at extremely high angular rates.

Figure 1:
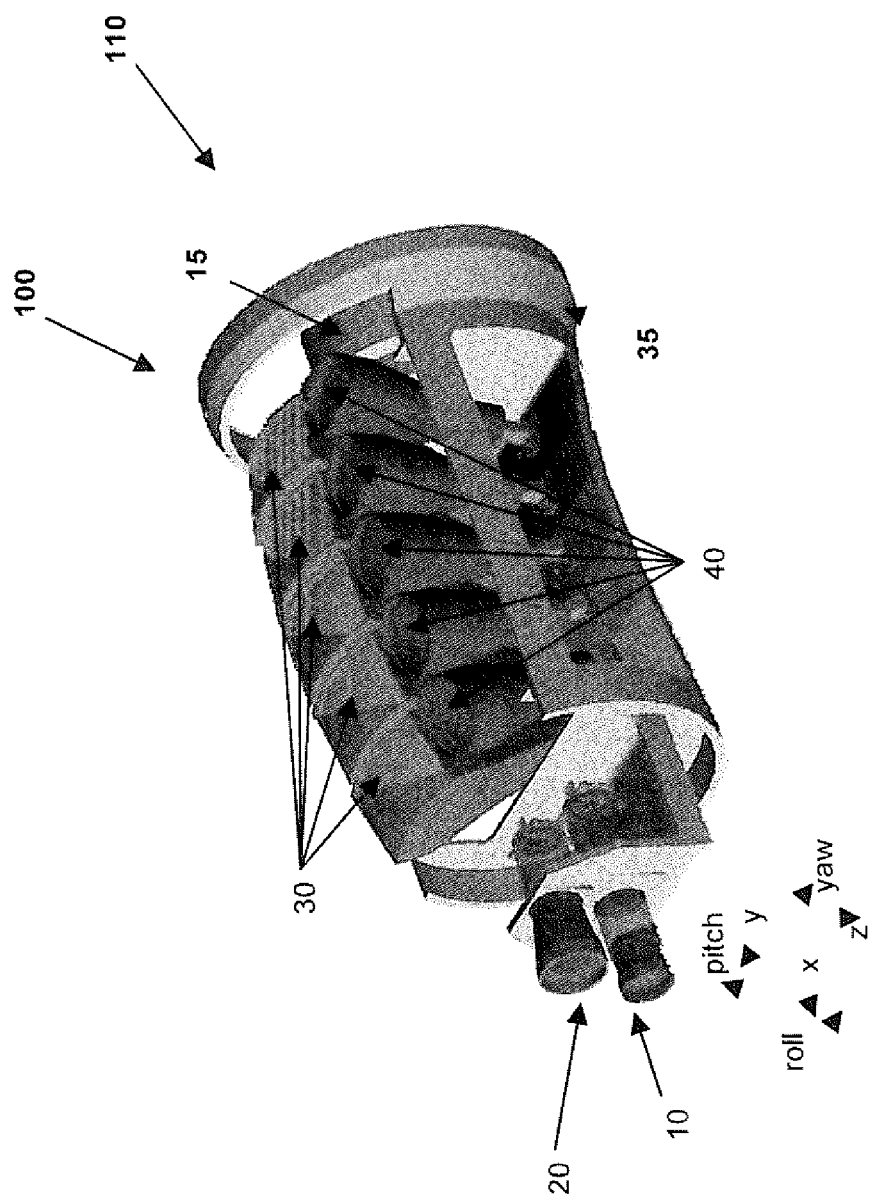
FIG. 1 is a sketch of an imaging system according to the invention.

Referring now to FIG. 1, a vehicle 110 including an imaging system 100 is shown to include an acquisition sensor 10, a cueing sensor 20 and imaging cameras 30. The acquisition sensor 10, the cueing sensor 20, and the imaging cameras 30 are mounted and aligned on a common support structure 35. Also shown is an inertia measurement unit (IMU) 15 as is known to those skilled in the art. This imaging system 100 is mounted on the vehicle 110. The acquisition sensor 10 is provided to initially locate a target (not shown) and the cueing sensor 20 is provided to more accurately track the target prior to fly by. The imaging cameras 30 are provided to capture images of a target (also referred to as a target object) when the target object is within the field of view of the detectors of the imaging cameras 30 as cued by the cueing sensor 20. Cueing sensor 20 and imaging cameras 30 share a similar optical design approach with highly compact, all refractive elements. Each is adapted to use commercially available detectors and emitters. The cueing sensor 20 operates in the Medium Wave Infrared (MWIR) (or possibly visible) spectral band and typically comprises a three element telescope assembly, a detector assembly encased in a vacuum Dewar and an open cycle refrigerator. The cryogenically cooled detector when mated to an f/2.4 MWIR telescope assembly provides the required resolution and high sensitivity needed.

The imaging cameras 30 include detector assemblies, here having five separate detectors and illuminator assemblies (illuminators) 40. The imaging cameras 30 operate in the visible spectral band that is matched to the spectral bandwidth of the laser illuminators 40. The telescope is an f/3.8 design with a wide Field of Regard (FOR) along the axis of a vehicle 110. The detectors used in the imaging cameras 30 are Charge Coupled Devices (CCDs) that are disposed along the image plane in order to spatially sample the object of interest from multiple perspectives. A corresponding one of the series of five separate laser illuminators 40 are co-aligned with the corresponding FOV of each one of the imaging cameras 30. As a target (not shown) passes through the FOR, illuminator pulse electronics causes the laser illuminators 40 to sequentially flash the target to freeze the image capture for each one of the imaging cameras 30. The resulting five digital images are stored in the cameras 30 and available for later transfer to a data link.

The cameras 30 require a complex exposure process for each of the images to achieve a satisfactory signal to noise ratio (SNR). Where each illuminator 40 is limited to a maximum peak power of about 100 W due to size and power constraints and a maximum "on" duration of about 650 ns to minimize image smear, the image on each CCD detector of the imaging cameras 30 is electronically shifted a row at a time synchronous with target motion, and the exposure is lengthened over as many as several hundred pixels of motion. This summation of the received energy provides a linear increase in SNR of the image. However, both the flash repetition period and the CCD row shift period must be synchronized and performed in the same precise period of time that it takes the target to transverse one resolution cell.

Figure 2:
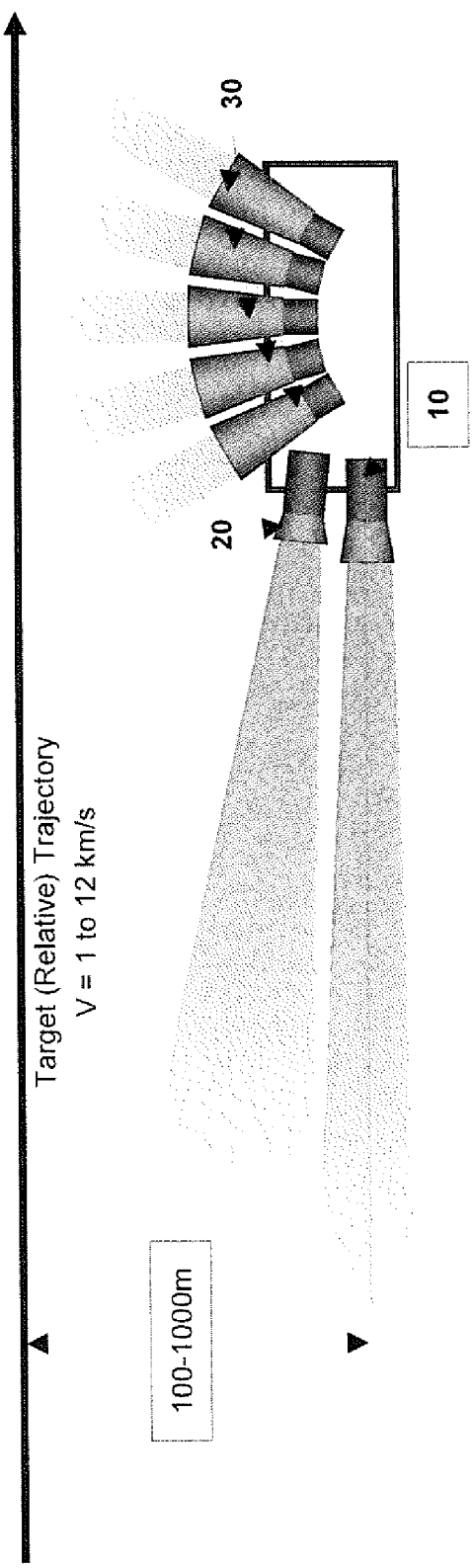
FIG. 2 is a sketch showing the various field of views associated with various detectors within the imaging system according to the invention.
Figure 12A:
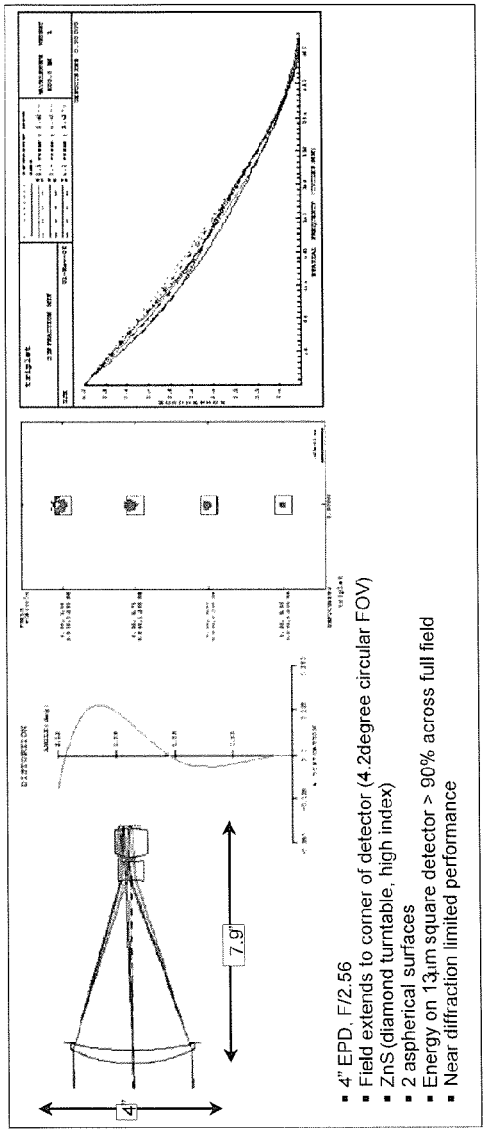
FIG. 12A are specification charts of the imaging camera of FIG. 12.
Figure 12:
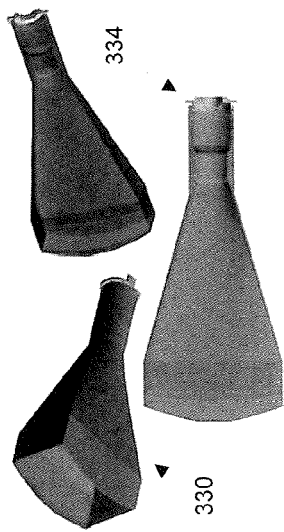
FIG. 12 is a sketch of various views of an imaging camera for an imaging system according to the invention.

Referring now to FIGS. 2 and 12, the imaging cameras 30 includes a plurality of detectors 334, here in the present embodiment five detectors, each of the detectors 334 having a corresponding field of view along a target trajectory of a target object. In a typical encounter, the target object may be 100 meters to 1000 meters from the imaging system 100 having a velocity of 1 to 12 kilometers/sec.

Figure 3:
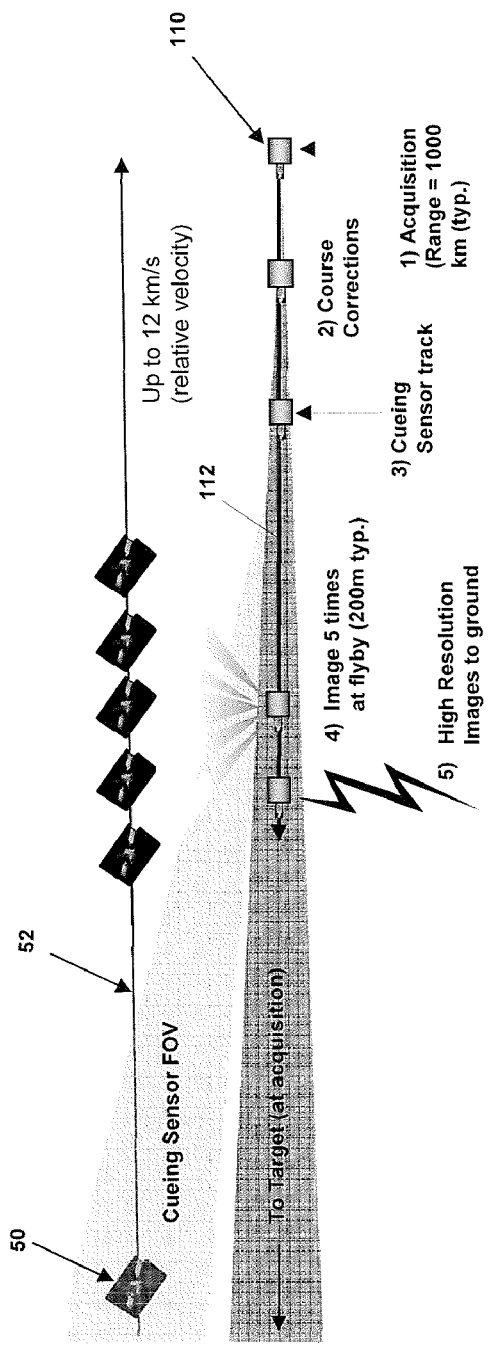
FIG. 3 is a sketch showing an encounter of an object vehicle with a camera vehicle including an imaging system according to the invention.

Referring now to FIG. 3, target vehicle 50 (i.e target 50) is travelling along a trajectory path 52 and a camera vehicle 110 is travelling along a trajectory path 112. At an instance of time, the camera vehicle 110 will approach the target vehicle 50 such that an image of the target vehicle 50 may be acquired as to be described in more detail hereinafter. Suffice to say here, the camera vehicle 110 with come within acquisition range of the target 50 and the acquisition sensor 10 will begin a track of the target 50 and make course corrections to the camera vehicle 110 as needed. Once within range, the cueing sensor 20 will capture the target 50 and begin to track the target 50 and when the target 50 is within the view of each one of the imaging cameras 30, prompt each one of the imaging cameras 30 to capture an image of the target 50, here five times, one by each of the detectors 330. The resulting high resolution images are now available to be transmitted to a ground site for further processing.

The forward looking sensor or cueing sensor 20 establishes track on the chosen target using cueing from the acquisition sensor 10. Moving Target Indication (MTI) is then used to separate the target from a fixed star background. Once acquired, the target is tracked using a weighted centroid (or similar) algorithm which provides angular accuracy considerably better than a single IFOV. Such tracking methods are widely understood by those skilled in the art of tracking algorithms.

Figure 3A:
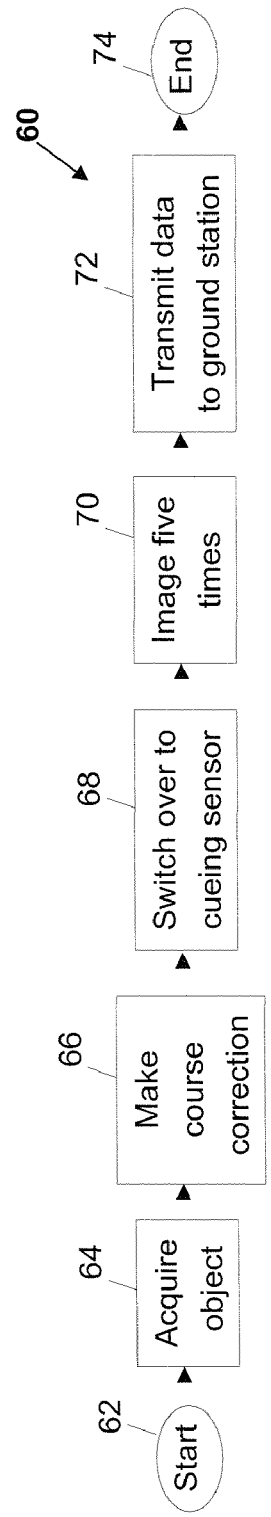
FIG. 3A is a simplified flow chart of the processing performed by the camera vehicle to acquire an image of an object according to the invention.

Referring now to FIG. 3A, a flowchart of an image acquisition process 60 showing the steps taken by the imaging system 100 will be described as would be implemented in a digital signal processor (not shown) to control the various components of the imaging system 100. It should be appreciated that a flowchart represents computer software instructions or groups of instructions. Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required of the particular apparatus. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

The image acquisition process 60 starts at step 62 and as shown in acquire target step 64, the acquisition sensor 10 acquires an object of interest, for example, target vehicle 50. As shown in step 66 (make some correction), a tracking algorithm would compute the trajectory of object vehicle 50 and the trajectory of camera vehicle 110 and make course corrections to the trajectory of camera vehicle 110 to cause camera vehicle 110 to approach object vehicle 50 as desired. When camera vehicle 110 passes within a predetermined distance of target vehicle 50, as shown in "switch over to cueing sensor" step 68, the cueing sensor 20 is activated to track the target vehicle 50. When target vehicle 50 is within the field of regard of the imaging cameras 30, the cueing sensor 20 activates each one of the imaging cameras 30 and as shown in step 70, an image is taken sequentially, here five times, by the respective detectors 330 within the detector assembly of the imaging cameras 30. As shown in step 72, the image data is then transmitted to a ground station for further processing, thus ending the image acquisition process 60 at step 74.

Figure 4:
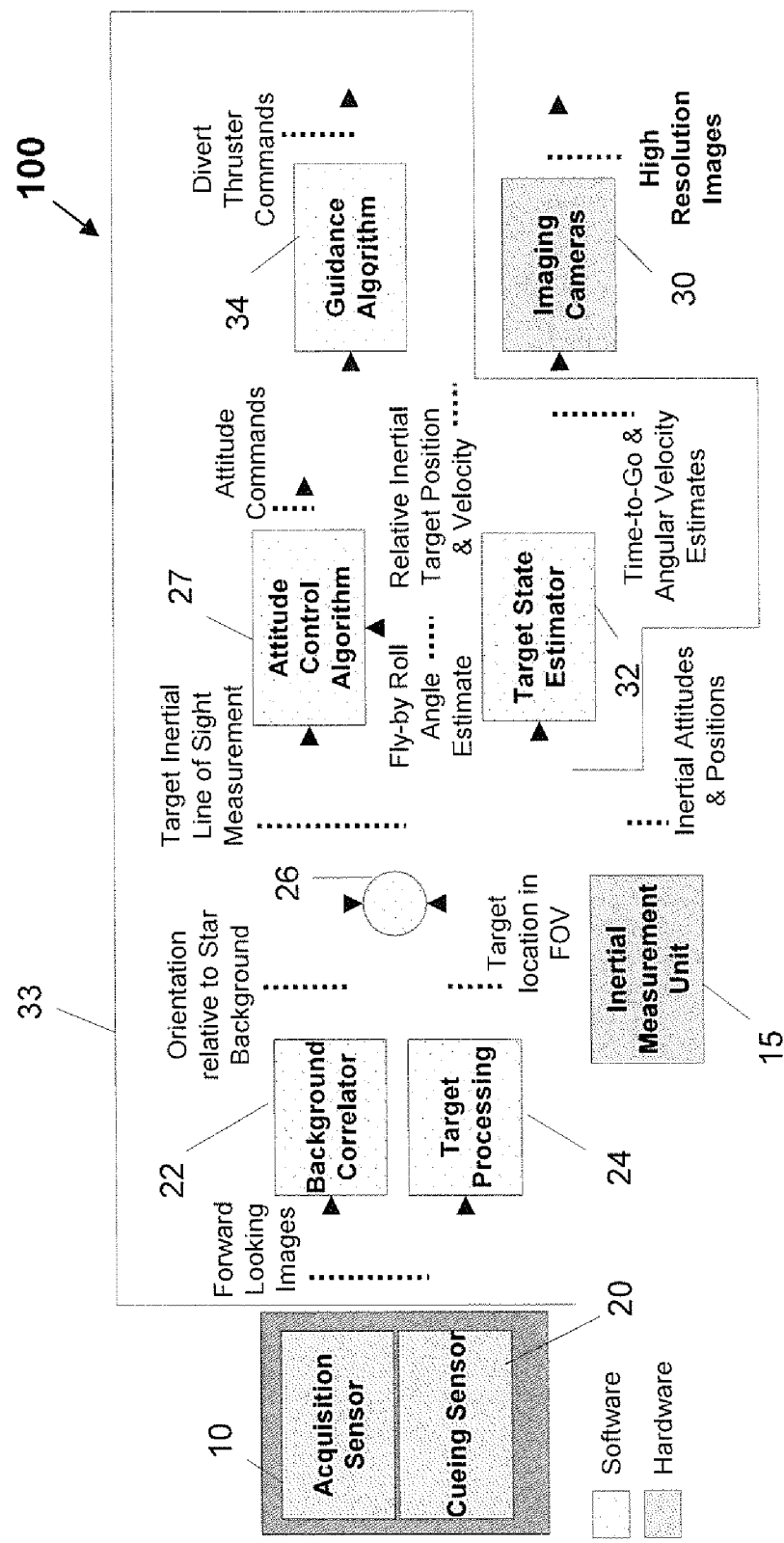
FIG. 4 is a functional block diagram of the imaging system according to the invention.

Referring now to FIG. 4, a functional block diagram of an imaging system 100 implemented by hardware and software is shown. The imaging system 100 includes the acquisition sensor 10, the cueing sensor 20 and the imaging cameras 30 as well as control and support electronics. The imaging system 100 further includes an inertial measurement unit (IMU) 15 and a guidance computer 33. The guidance computer 33 includes a background correlator process 22 and a target processing process 24, a comparator process 26, an attitude control algorithm process 27, a target state estimator process 32 and a guidance algorithm process 34. In this embodiment, signals from the acquisition sensor 10 and the cueing sensor 20 are fed to the background correlator process 22 and fed to the target processing process 24. The background correlator process 22 provides a signal indicative of the orientation relative to star background which is fed to the comparator process 26. The target processing process 24 provides a signal indicative of the target location in the field of view which is also fed to the comparator process 26. From the above, the comparator process 26 provides a signal indicative of the target inertial line of sight measurement which is fed to the attitude control algorithm process 27 as well as to the target state estimator process 32. The inertial measurement unit (IMU) 15 provides inertial attitudes and positions to the target state estimator process 32 and to the attitude control algorithm process 27. The target state estimator process 32 provides a time-to-go and angular velocity estimates to the imaging cameras 30. The target state estimator process also provides a fly-by roll angle estimate to the attitude control algorithm process 27. The target state estimator process 32 still further provides a relative inertial target position and velocity signal to the guidance algorithm process 34 which in turn provides divert thruster commands as needed. From the various inputs, the attitude control algorithm process 27 provides attitude commands as needed. With the above embodiment, the camera vehicle 110 can be controlled with the attitude commands and divert thruster commands to space the camera vehicle 110 in proximity of a target so that the imaging cameras 30 with the five detectors 330 can capture high resolution images of the target.

Figure 5:
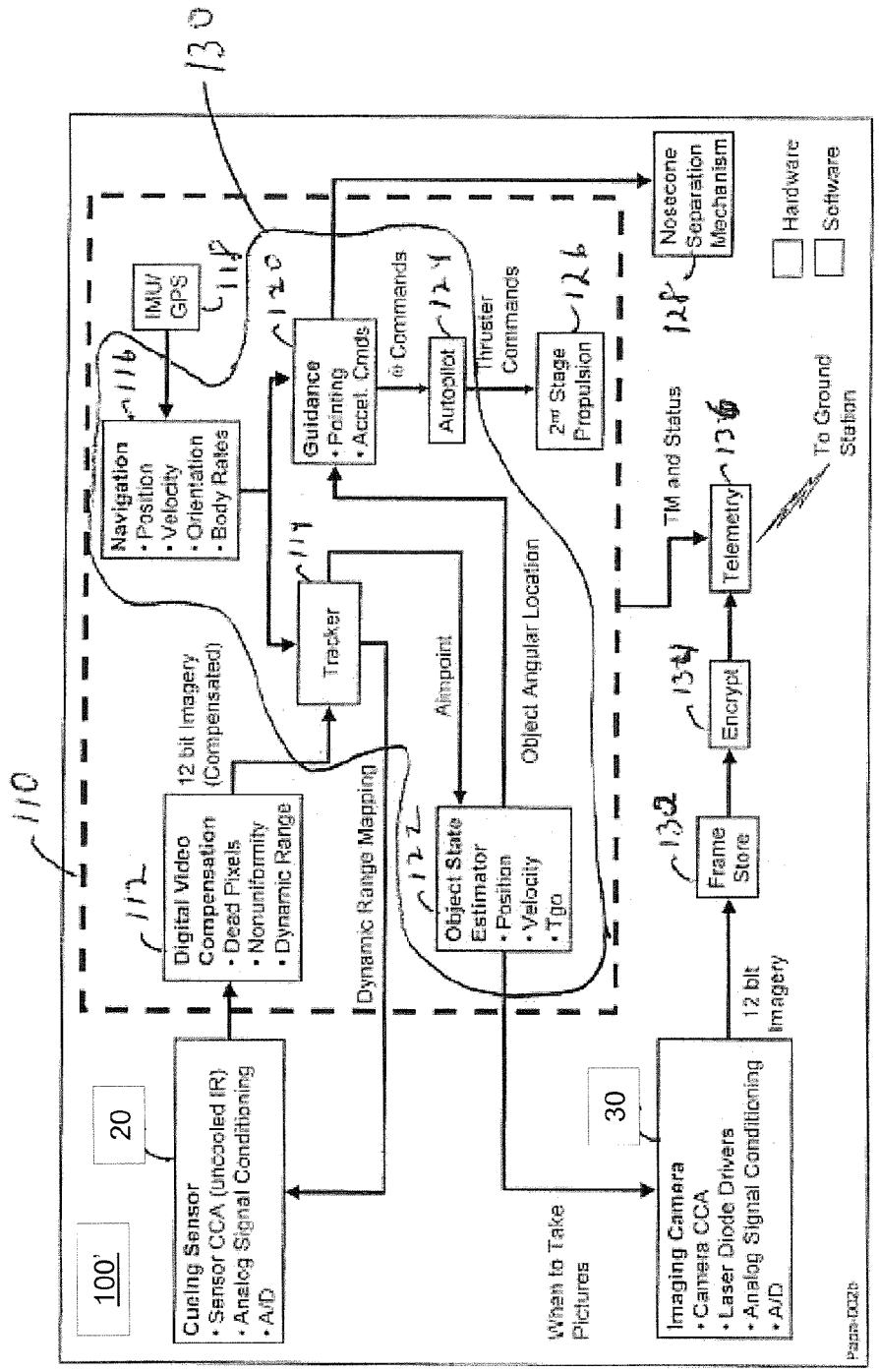
FIG. 5 is an alternative functional block diagram of an imaging system according to the invention.

Referring now to FIG. 5, a functional block diagram of an alternative embodiment of the imaging system 100' implemented by hardware and software is shown. The imaging system 100' includes the cueing sensor 20 and the imaging cameras 30 as well as control and support electronics 110. The imaging system 100' further includes an inertial measurement unit (IMU) and global positioning system (GPS) 118 and a guidance computer 130. The guidance computer 130 includes a navigation process 116, a tracker 114, a guidance process 120, and object state estimator 122 and an autopilot 124. The navigation process 116 accepts inputs from the inertial measurement unit (IMU) and global positioning system (GPS) 118 and provides various navigational information to the tracker 114 and the guidance algorithm 120. The tracker 114 provides navigational information and track signals to the object state estimator 122 which in turn provides information to the imaging cameras 30 and to the guidance algorithm 120. The guidance algorithm 120 provides commands to the autopilot 124 and to a (possible) nosecone separation mechanism 128. The autopilot 124 provides thruster commands to the second stage propulsion unit 126 to guide the vehicle as required. It should be appreciated that such guidance is well know in the art and will not be explained further here. The guidance computer 130 also provides telemetry information to a telemetry radio 136 which can be then transmitted to a ground station.

The cueing sensor 20 extracts images of an approaching object. The cueing sensor 20 provides sensor data to a digital video compensation system 112 where digital imagery data is provided to the tracker 114. Video processing adjusts for non-uniformities and excludes known dead pixels before passing the image to the tracker 114, which determines the position of the target object. The digital imagery data is processed by the tracker 114 with navigational data from the navigation process 116 and then provides dynamic range mapping data to the cueing sensor 10. As the imaging sensor 100' approaches an object of interest, the object state estimator 122 provides control signals to the imaging camera 20 to control the imaging camera 20 as to when to take pictures. The output of the imaging camera 20 is fed to a frame store 132, encrypted by a crypto device 134 and fed to telemetry radio 136 to be transmitted to the ground receiving station. It should now be appreciated that the object state estimator 122 produces relative position and velocity estimates which are used to 1) guide the vehicle to a precise predetermined miss, and 2) estimate the exact time the imaging camera 20 need to be 'shuttered' to receive the image of the object flying past. The collected target images are then encrypted before being sent down to the ground receiving station.

Figure 5A:
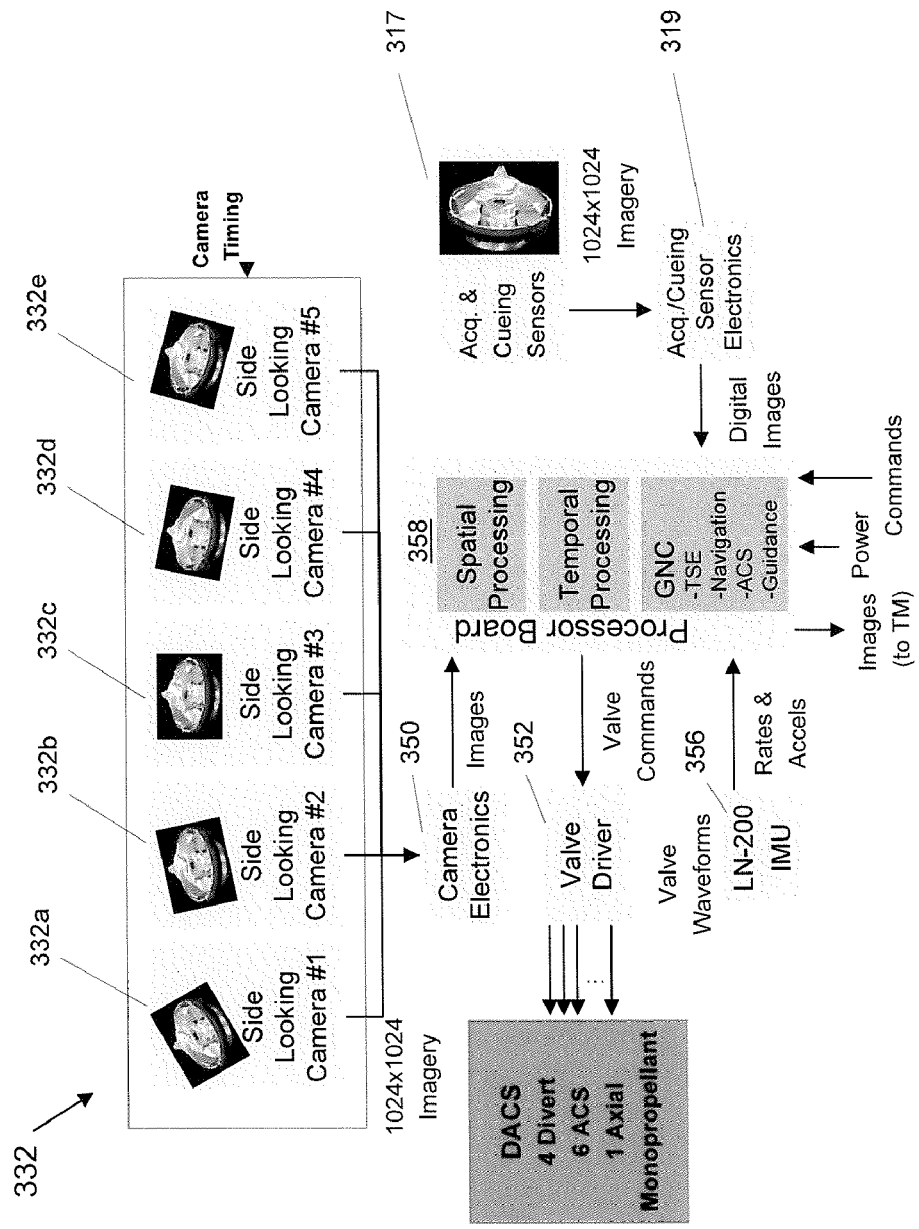
FIG. 5A is a top level functional block diagram of an imaging system according to the invention.

Referring now to FIG. 5A, a top level block diagram of an embodiment of the imaging system is shown. A camera assembly 332 includes five side looking cameras 332a, 332b, 332c, 332d and 332e. Camera electronics 350 control the operation of the five side looking cameras 332a, 332b, 332c, 332d and 332e and corresponding illuminators (not shown) as well as capture and store images taken by the five side looking cameras 332a, 332b, 332c, 332d and 332e to provide the images to a processor 358. The processor 358 is capable to perform spatial processing and temporal processing from the digital images captured by the acquisition and cueing sensors 317 to provide the required timing to control the side looking cameras 332a-332e. Acquisition and cueing sensors 317 provide data to acquisition and cueing sensor electronics 319 which in turn feeds data to the processor 358. Inertia Measurement Unit 356 also provides data to the processor 358. From the latter data, processor 358 provides valve commands to a valve driver 352 to provide control to various thrusters to maneuver the vehicle as required. The processor 358 is capable of providing the various navigational computations to control the course of the vehicle which is here accomplished by controlling the various thrusters. As described hereinabove, as a target object passes by each one of the side looking cameras 332a-332e will capture an image which will then be processed by the processor 358 to provide an enhanced image of the target object.

Figure 6:
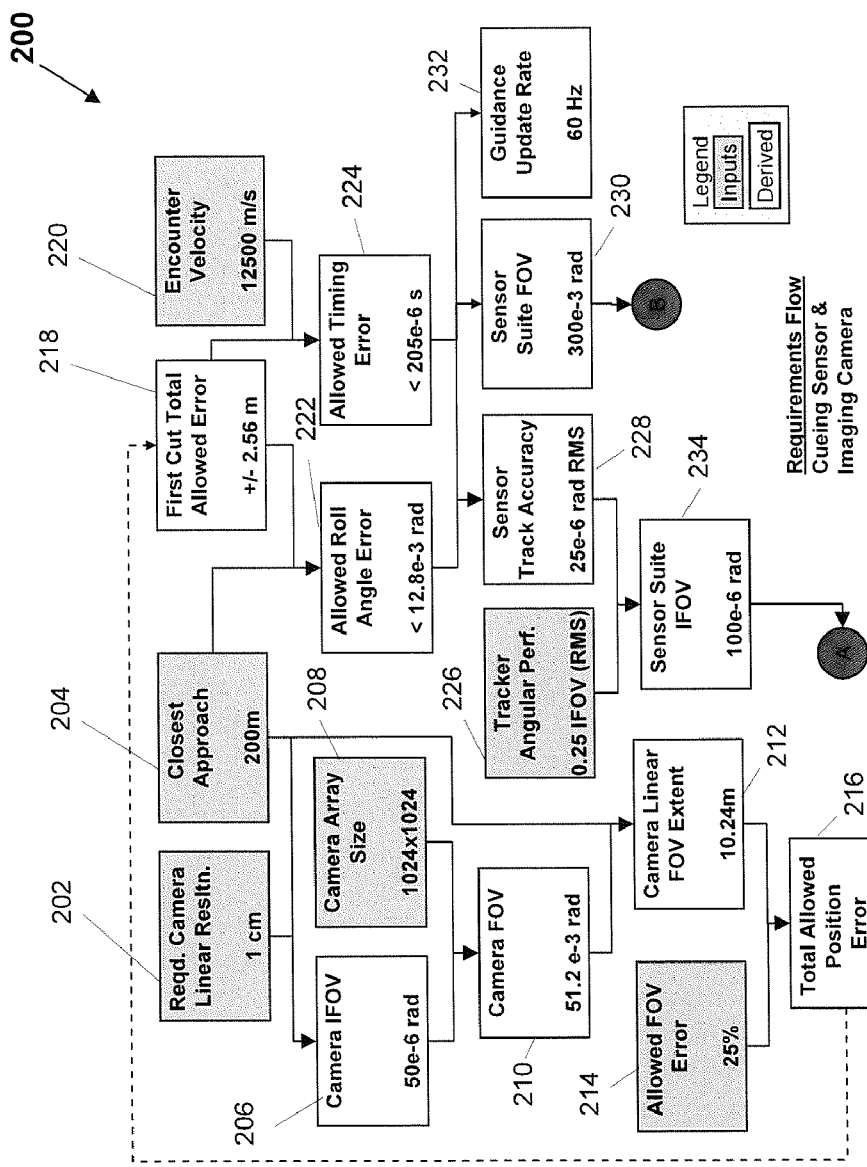
FIGS. 6 and 7 provide a flow diagram of the requirements of an imaging system according to the invention.
Figure 7:
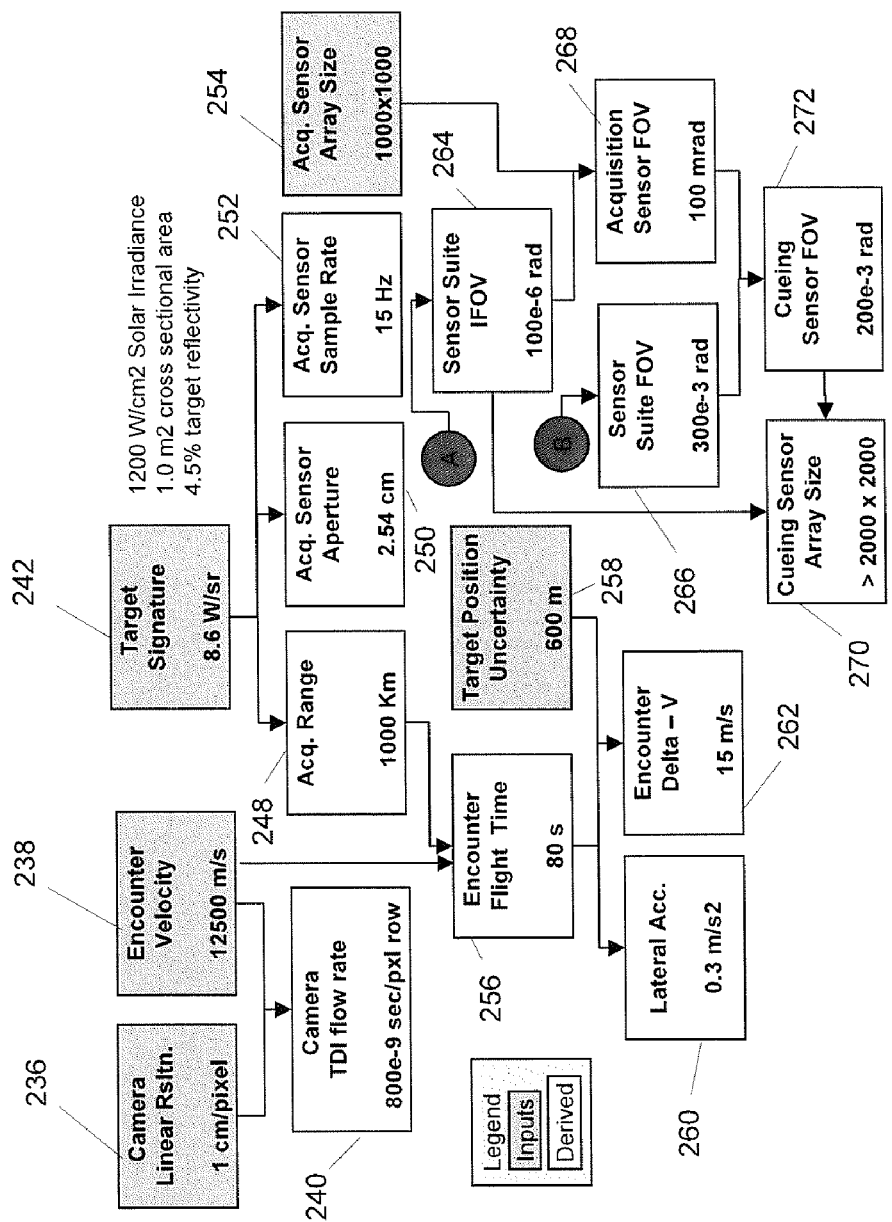

Referring now to FIG. 6 and FIG. 7, a requirements flow process 200 is shown to calculate and implement the necessary requirements for imaging system 100. As shown in step 202, a required camera linear resolution is provided, here one cm and as shown in step 204, a closest approach distance is provided, here 200 meters. As shown in step 206, from the latter a camera IFOV is calculated, here 50 e-6 radians. As shown in step 208, a camera array size is allocated, here 1024 by 1024 and from the data provided in step 206 and step 208, in step 210 a camera FOV is calculated here, 51.2 e-3 radians. From the data from step 204 and the data from step 210, in step 212, a camera linear FOV extent is calculated, here 10.24 meters. In step 214, an allowed FOV loss due to errors is provided, here 25% and using the data from step 214 and step 212, in step 216 a first cut total allowed position error is calculated, here +/−2.56 meters. The output of step 216 is provided to step 218 which is now the assumed first cut total allowed error of +/−2.56 meters.

In step 220, an encounter velocity is provided consistent with high speed orbital encounters, here 12500 meters/second. Using the data from step 218 and step 220, in step 224 an allowed timing error is calculated, here less than 205 e-6 seconds. Using the data from step 204 and step 218, in step 222 an allowed roll angle error is calculated, here less than 12.8 e-3 radians. In step 228, using the data from step 222 and step 224, a sensor track accuracy calculation is provided, here 25 e-6 radians RMS. In step 230 using the data from step 222 and step 224, a sensor suite FOV is provided, here 300 e-3 radians. In step 232, using the data from step 222 and step 224, a guidance update rate is provided, here 60 hertz. In step 226, an assumed tracker angular performance is provided, here 0.25 IFOV (RMS). Using the data from step 226 and step 228, in step 234 a sensor suite IFOV is calculated, here 100 e-6 radians.

In step 236, a required camera linear resolution value is provided, here 1 cm/pixel and in step 238, an encounter velocity value is provided, here 12500 meters/second. Using the data from steps 236 and 238, in step 240, a camera time delay integration (TDI) flow rate is calculated, here less than 800 e-9 sec/pixel row. In step 242, a target signature value is provided, here 8.6 Watts/steradian. From the data from step 242, in step 248 an acquisition range is calculated, here 1000 kilometers, in step 250, an acquisition sensor aperture is calculated, here 2.54 cm, and in step 252 an acquisition sensor sample rate is calculated, here 15 Hertz. In step 254 an acquisition sensor array size is provided, here 1000 by 1000. Using the data from step 238 and step 248, in step 256 an encounter flight time is calculated, here 80 seconds. In step 258, a target position uncertainty is provided, here 600 meters. In step 260, using the data from step 256 and step 258, a lateral acceleration is calculated, here 0.3 meters/second squared. In step 262, using the data from step 256 and step 258, an encounter delta for velocity is calculated, here 15 meters/second.

From step 234, a sensor suite IFOV is provided to step 264, here 100 e-6 radians. From step 230, a sensor suite FOV is provided to step 266, here 300 e-3 radians. In step 268, using the data from step 264 and step 254, an acquisition sensor FOV is calculated, here 100 mrad. Using the data from step 266 and step 268, in step 272 a cueing sensor FOV is calculated, here 200 e-3 radians. In step 270, using the data from step 264 and step 272, a cueing sensor array size is calculated, here 2000×2000. It should now be appreciated, from the latter, the necessary requirements for the imaging system 100.

Referring now to FIGS. 8A, 8B, 8C and 8D and having reviewed the necessary requirements for the imaging system 100, the relative velocities of the final engagement requires that Time-to-go (tgo) estimates be very precise to ensure that the target appears in the camera FOV at flyby. This is accomplished by taking angular measurements from the forward looking sensor and applying an Extended Kalman Filter (EKF) similar to tactical missile techniques used for passive fuzing. FIG. 8A shows the time to go filter setup with respect to the estimate errors and FIG. 8C shows the required accuracy of the time to go (tgo) estimate as the engagement approaches flyby. This particular implementation of the system shows adequate convergence occurring 1 frame before closest approach. FIG. 8B shows the calculation used for the filter estimates. FIG. 8D shows the calculations used to update the filter estimates during execution. Although the mechanism of an EKF is well known, this implementation using passive fuzing algorithms combined with an offset miss is unique to this device.

Figure 9:
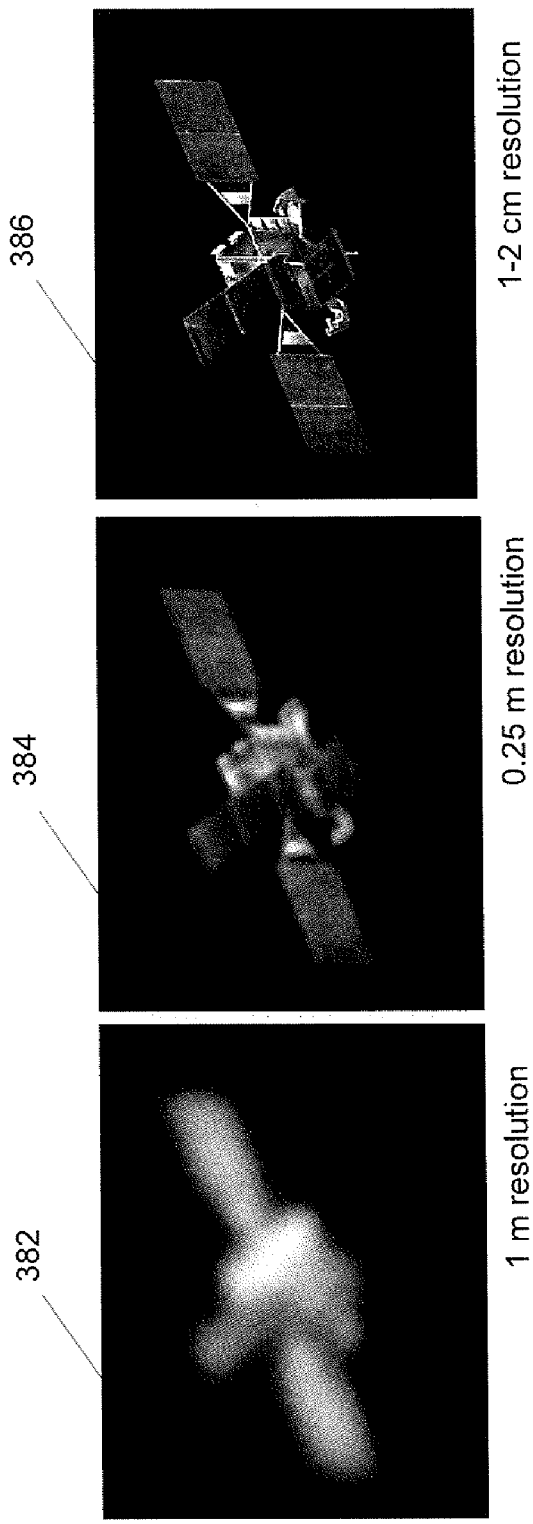
FIG. 9 includes images showing various imaging results with enhanced resolution quality.

Referring now to FIG. 9, an illustration is shown that provides a comparison of the relative quality of satellite image photography. The ability to visualize small features of a target such as here a satellite, provides the analyst substantial insight into satellite performance and functionality. Ground based capabilities are typically capable of resolution in the 1 m range, providing very limited knowledge about specific functionality. Centimeter quality resolution is necessary to establish a reasonable understanding of the equipment visible on the surface of a satellite. It should be appreciated, the quality going left to right improves with the image on the right having improved clarity providing an analyst a better image to analyze. Hence, the quality of the image of the satellite in image 382 having a one meter resolution provides an analyst very little data, the quality of the image of the satellite in image 384 having a 0.25 meter resolution provides an analyst some utility data, the quality of the image of the satellite in image 386 having a 1-2 cm resolution provides an analyst precise evaluation of visible features on the spacecraft surface.

Figure 10:
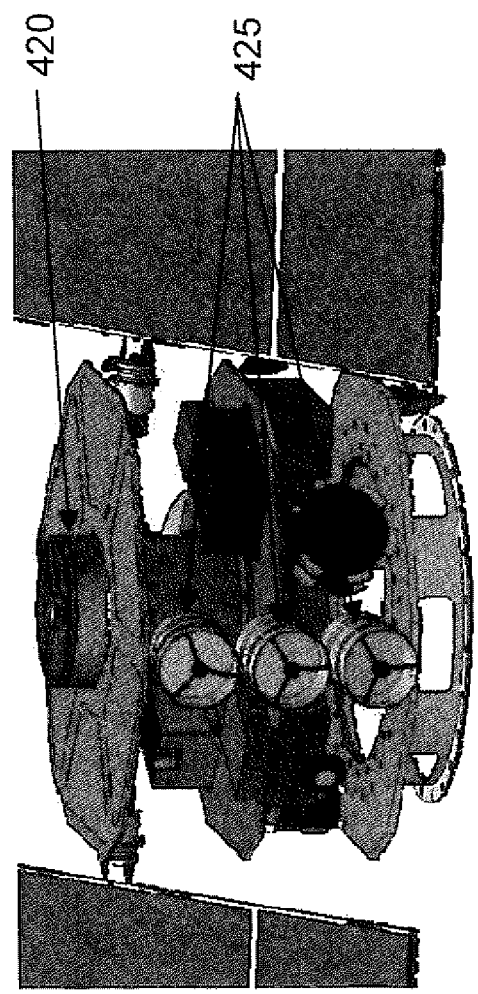
FIG. 10 is a sketch of an alternative embodiment of an imaging system according to the invention.

Referring now to FIG. 10, another possible embodiment of an imaging system 101 is shown. This particular system is optimized for encounters at higher orbits, where the closing velocities are lower. A single forward looking sensor 420 now accomplishes the same tasks undertaken by the acquisition sensor 10 and cueing sensors 20 which were designed for higher closing velocities. Larger standoff distances, deemed necessary as a safety precaution, drive a larger image camera 425 entrance aperture, but the basic concept of the device is identical to the previously described suborbital version 110.

Referring now to FIG. 11, a sketch of an illuminator 340 is shown similar to each one of the illuminators 40 in FIG. 1. The latter is capable of uniformly illuminating a ten by ten meter target at 200 meters with enough optical power to produce a worst case SNR of more than five. The illuminator 340 includes a laser diode array 333, a homogenizer 345 and a telephoto lens assembly 347 and operates in a known manner. In a preferred embodiment, the laser bank operates at a wavelength of 808 nanometers and has a peak optical power of 1280 watts. The wedged homogenizer 345 produces a relatively square output from a solid state laser bank 333 with the field angles equal in both directions, solving the anamorphic beam problem. The optics has an EFL of 120 millimeters and an EPD of 50.4 millimeters. An enlarged view of a diode illuminator 333 is shown in FIG. 11A. One possible source for such an illuminator is Coherent, Inc located in Santa Clara Calif. (for example, part No. ST-81480Q-400G). The chosen laser source can be overdriven by a factor of 8 due to the extremely low duty factor (less than 1 msec per pass). As a result, the entrance pupil of the imaging camera 330 needs be only three inches in diameter.

Refer now to FIG. 12, a sketch showing various views of side looking camera 330 optimized for LEO operations is shown. The optics in this camera 330 are configured as an optical triplet layout providing a 4.2 degree circular field of view. FIG. 12A shows the optical triplet layout as well as a graph of the performance characteristics. High power laser illuminators 347 allow a relatively small four inch (effective) aperture with a F/2.56 focus with day/night operation. The detector 334 includes a high line transfer rate charge coupled device (CCD), thus enabling time delay integration (TDI) capability. This detector assembly 334 is designed specifically to capture images at high speed by orienting the line transfer motion of the CCD with the image motion of the target. If this is done correctly, the image, as it integrates, can be moved at the same rate and direction as the motion of the target across the focal plane. This allows image integration to continue as the target moves across several nominal pixels. This is further explained by the text associated with FIG. 14.

Figure 13:
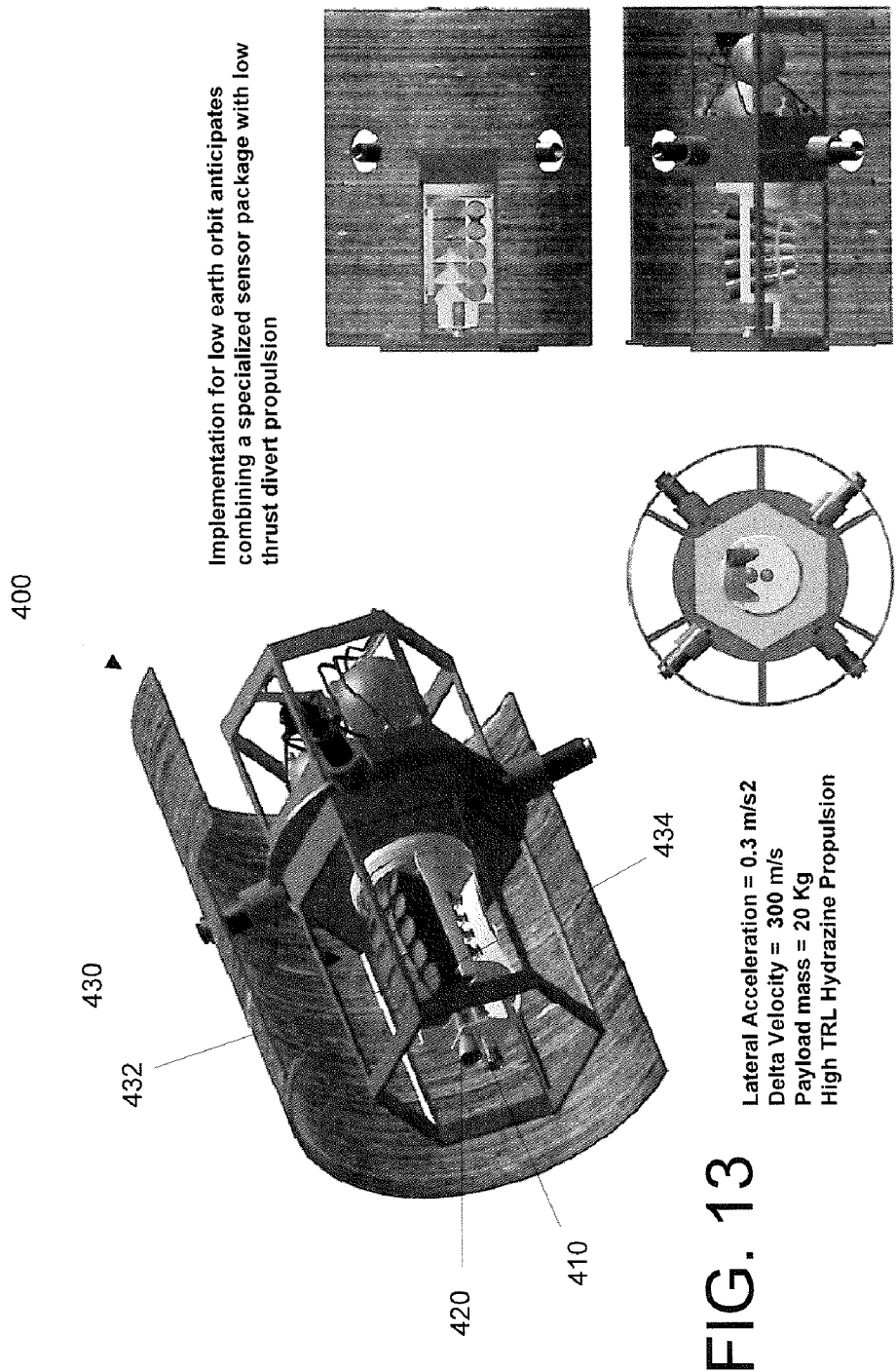
FIG. 13 is a sketch of an alternative embodiment of an imaging system implemented in a low earth orbit satellite according to the invention.

Referring now to FIG. 13, another possible embodiment of an imaging system 400 is shown, here embodied as a satellite, wherein an acquisition sensor 410 is provided to initially locate a target and a cueing sensor 420 is provided to more accurately track the target. An imaging camera 430 is provided with a plurality of imaging sensors 432, here five. Also provided is a plurality of illuminators 434, here five. The imaging system 400 is operates similar as described with imaging system 100.

Figure 14:
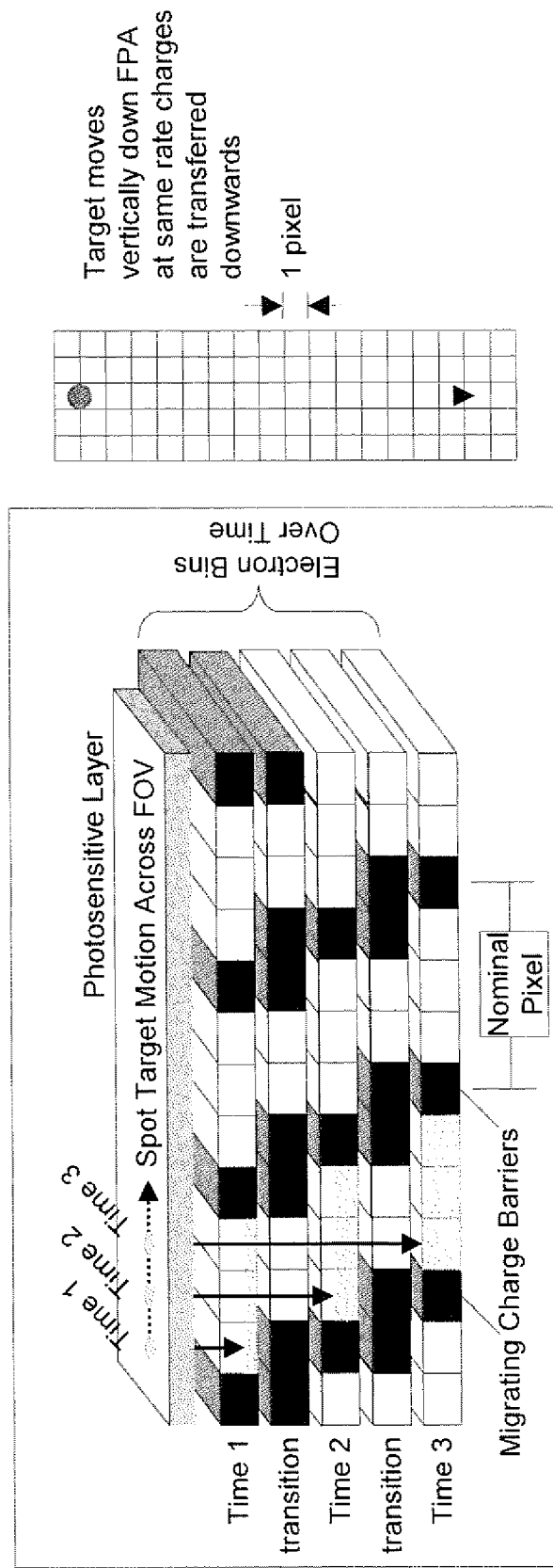
FIG. 14 is a chart showing migrating charge barriers for various transition times for a detector within an imaging system according to the invention.

A charge coupled device (CCD) is divided into two halves. The top half of the CCD is open to integrate photons, and is what we normally think of as a "focal plane array". The bottom half of the array is electronically contiguous & identical with the top half, but is covered with an optically opaque material which prevents light from reaching the CCD. An image integrated on the top half of the CCD is quickly transferred to the bottom (opaque) half at the end of the nominal integration period so that readout can occur at a slower rate. This image transfer is done by physically cascading the collected photons from the top half to the bottom half of the array. Notably, during this transfer, the focal plane continues to be active and integrate up photons. The effects on the final image are generally small, since the transfer time is very small compared to the integration time, but can be significant if a portion of the FOV contains a bright object or reflection. This phenomenon can be seen in commercial digital cameras as a vertical streak through the image where a bright object is focused. Referring now to FIG. 14, integration times for the imaging system 100 geometry are so short it is difficult to collect enough photons without longitudinal smearing an image. Therefore, some kind of image stabilization is necessary to increase integration time to the point where the images are useful. Time Delay Integration (TDI) provides a method for moving accumulated charges underneath the target at the same rate the target is moving. In this construct, the nominal integration time is set to zero while charges are transferred to keep pace with the moving target across 64 pixels. Image integration continues during charge transfer, sor this method provides the signal improvement needed to establish adequate signal-to-noise ratio (SNR), and does so without moving parts.

In the present invention, the nominal integration time is set to zero, and image transfer starts immediately after the CCD is activated. The transfer rate is controlled, so that the charges are moved at exactly the same speed that the image is moving down the FOV. This technique, called Time Delayed Integration (TDI), collects sharp imagery from objects that are typically moving much too fast to collect with conventional methods.

As described above, track signals are sent to a Target State Estimator, which in turn controls the timing of the imaging camera for exposure in each of the detectors. Using the above time delayed integration technique in each of the detectors to capture a similar image and then combining the signals from the CCDs repeatedly provides a desired enhanced image.

It should now be appreciated an imaging device in the present invention includes an acquisition sensor to locate an object of interest; a cueing sensor to track an object of interest; an imaging camera having a plurality of detectors juxtapositionally aligned to increase the field of regard of an image of interest and a plurality of corresponding illuminators, each illuminator co-aligned with the field of view of a corresponding detector; and a digital processor connected to the cueing sensor to receive tracking signals indicative of the track of the object of interest and connected to the imaging camera to provide a control signal to the imaging camera to activate each one of the detectors when the object of interest is within the field of view of a detector. The latter provides a plurality of images which can then be combined to provide an enhanced image suitable for analysis. Furthermore, each one of the plurality of detectors are arranged such that line transfer motion of charge coupled devices are aligned with an image motion of the object of interest. It should further be appreciated in some situations, the acquisition sensor and the cueing sensor may be provided by a single tracking sensor to locate and track a target for imaging by the imaging camera.

Having described the preferred embodiments of the invention, it will now become apparent to one of ordinary skill in the art that other embodiments incorporating their concepts may be used. It is felt therefore that these embodiments should not be limited to disclosed embodiments but rather should be limited only by the spirit and scope of the appended claims.

What is claimed is:

1. An imaging device comprising:
   a cueing sensor to locate and track an object of interest;
   an imaging camera having a plurality of detectors juxtapositionally aligned to increase the field of regard of an image of interest and a plurality of corresponding illuminators, each illuminator co-aligned with the field of view of a corresponding detector; and
   a digital processor connected to the cueing sensor to receive tracking signals indicative of the track of the object of interest and connected to the imaging camera to provide a control signal to the imaging camera to activate each one of the detectors when the object of interest is within the field of view of a detector.

2. The imaging device as recited in claim 1 wherein the sensor comprises:
   a three element telescope; and
   a detector encased in a vacuum Dewar with an open cycle refrigerator.

3. The imaging device as recited in claim 1 wherein the imaging camera comprises:
   a seven element telescope; and
   the plurality of detectors number five and comprises charge couple devices aligned along the image plane to spatially sample a large field of regard.

4. The imaging device as recited in claim 1 wherein the control signal for the digital processor controls the imaging camera to sequentially flash each illuminator to illuminate the image of interest while the object of interest is in the field of view of the corresponding detector as the image of interest passes through the field of view of each of the plurality of detectors.

5. The imaging device as recited in claim 4 comprising digital memory to store digital images captured by each one of the plurality of detectors.

6. The imaging device as recited in claim 5 wherein the digital signal processor provides a control signal in response to the tracking signal from the sensor to shift the field of view of the plurality of detectors to repeatedly capture digital images of the object of interest with the plurality of detectors.

7. The imaging device as recited in claim 6 wherein digital images of the object of interest is captured in excess of 150 times as said object of interest passes by.

8. The imaging device as recited in claim 7 wherein said digital images are summed to increase digital quality of a resulting image.

9. The image device as recited in claim 3 wherein said charge coupled devices are synchronized to capture images in a period of time an object of interest transverses one resolution cell of one centimeter.

10. An imaging device comprising:
- an acquisition sensor to locate an object of interest:
- a cueing sensor to track an object of interest;
- an imaging camera having a plurality of detectors juxtapositionally aligned to increase the field of regard of an image of interest and a plurality of corresponding illuminators, each illuminator co-aligned with the field of view of a corresponding detector; and
- a digital processor connected to the cueing sensor to receive tracking signals indicative of the track of the object of interest and connected to the imaging camera to provide a control signal to the imaging camera to activate each one of the detectors when the object of interest is within the field of view of a detector.

11. The imaging device as recited in claim 10 wherein the cueing sensor comprises:
- a three element telescope; and
- a detector encased in a vacuum Dewar with an open cycle refrigerator; and
- the imaging camera comprises:
- a seven element telescope; and
- the plurality of detectors number five and comprises charge couple devices aligned along the image plane to spatially sample a large field of regard.

12. The imaging device as recited in claim 10 wherein the control signal for the digital processor controls the imaging camera to sequentially flash each illuminator to illuminate the image of interest while the object of interest is in the field of view of the corresponding detector as the image of interest passes through the field of view of each of the plurality of detectors.

13. The imaging device as recited in claim 12 comprising digital memory to store digital images captured by each one of the plurality of detectors.

14. The imaging device as recited in claim 13 wherein the digital signal processor provides a control signal in response to the tracking signal from the cueing sensor to shift the field of view of the plurality of detectors to repeatedly capture digital images of the object of interest with the plurality of detectors.

15. The imaging device as recited in claim 14 wherein digital images of the object of interest is captured in excess of 150 times as said object of interest passes by.

16. The imaging device as recited in claim 15 wherein said digital images are summed to increase digital quality of a resulting image.

17. The image device as recited in claim 12 wherein said charge coupled devices are synchronized to capture images in a period of time an object of interest transverses one resolution cell of one centimeter.

18. An imaging device comprising:
- an acquisition sensor to locate an object of interest:
- a cueing sensor to track the object of interest;
- an imaging camera having a plurality of detectors juxtapositionally aligned to increase the field of regard of an image of interest and wherein each one of the plurality of detectors are arranged such that line transfer motion of charge coupled devices are aligned with an image motion of the object of interest and a plurality of corresponding illuminators, each illuminator co-aligned with the field of view of a corresponding detector; and
- a digital processor connected to the cueing sensor to receive tracking signals indicative of the track of the object of interest and connected to the imaging camera to provide a control signal to the imaging camera to activate each one of the detectors when the object of interest is within the field of view of a detector.

* * * * *